United States Patent
Mohrlock et al.

(10) Patent No.: US 8,925,945 B2
(45) Date of Patent: Jan. 6, 2015

(54) SHEET-METAL CONTROL ARM FOR A WHEEL SUSPENSION OF A MOTOR VEHICLE

(71) Applicant: Audi AG, Ingolstadt (DE)

(72) Inventors: Dominik Mohrlock, Ingolstadt (DE); Wolfgang Seemüller, Gilching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/180,099

(22) Filed: Feb. 13, 2014

(65) Prior Publication Data

US 2014/0239608 A1  Aug. 28, 2014

(30) Foreign Application Priority Data

Feb. 25, 2013  (DE) .......................... 10 2013 003 145

(51) Int. Cl.
*B60G 3/04*  (2006.01)

(52) U.S. Cl.
USPC .................................... 280/124.134

(58) Field of Classification Search
CPC ................................. B60G 7/001; B60G 3/06
USPC ...................... 280/124.134; 29/897.2; 72/254
See application file for complete search history.

(56) References Cited

U.S. PATENT DOCUMENTS

| | | | |
|---|---|---|---|
| 8,388,000 B2 * | 3/2013 | Hessing et al. | 280/124.134 |
| 8,414,002 B2 * | 4/2013 | Yu et al. | 280/124.134 |
| 8,414,003 B2 * | 4/2013 | Yu et al. | 280/124.134 |
| 2004/0135337 A1 * | 7/2004 | Alesso et al. | 280/124.134 |
| 2011/0033230 A1 | 2/2011 | Brunneke et al. | |
| 2013/0328283 A1 * | 12/2013 | Korte et al. | 280/124.134 |

FOREIGN PATENT DOCUMENTS

| | | |
|---|---|---|
| DE | 43 22 304 | 11/1994 |
| DE | 102008001157 | 11/2009 |

* cited by examiner

*Primary Examiner* — Faye M. Fleming
(74) *Attorney, Agent, or Firm* — Henry M. Feireisen LLC

(57) ABSTRACT

A sheet-metal control arm for a wheel suspension of a motor vehicle includes a base body, and two eyelets arranged in spaced-apart relationship at least at one end of the base body. Each eyelet has an opening, with the openings of the eyelets receiving a chassis bearing. At least one of the eyelets has a wall which is provided with a projection which is configured to at least partly bridge a gap to a wall of the other one of the eyelets.

20 Claims, 1 Drawing Sheet

SHEET-METAL CONTROL ARM FOR A WHEEL SUSPENSION OF A MOTOR VEHICLE

CROSS-REFERENCES TO RELATED APPLICATIONS

This application claims the priority of German Patent Application, Serial No. 10 2013 003 145.1, filed Feb. 25, 2013, pursuant to 35 U.S.C. 119(a)-(d), the disclosure of which is incorporated herein by reference in its entirety as if fully set forth herein.

BACKGROUND OF THE INVENTION

The present invention relates in general to the field of wheel suspensions, and more particularly to a sheet-metal control arm for a wheel suspension.

The following discussion of related art is provided to assist the reader in understanding the advantages of the invention, and is not to be construed as an admission that this related art is prior art to this invention.

The design of a control arm for a wheel suspension of a motor vehicle has to reconcile various objectives. On one hand, thin-walled components should be used for the control arm to realize a lightweight construction. On the other hand, the control arm should be constructed strong enough to ensure adequate load-bearing capability. Moreover, when installed, a control arm has to withstand various stress exposures during operation of the motor vehicle, with some parts of the control arm being exposed to greater stress than other parts thereof. There are many ways to manufacture control arms.

Transverse arms in particular of a wheel suspension of a motor vehicle are among those components that are exposed to stress the most. Transverse arms are provided to receive the wheels and to guide them. In other words, a transverse arm provides the movable connection of the body of a motor vehicle with the wheel. Transverse arms may be configured as cast part. Furthermore, transverse arms may be formed as hollow sheet-metal construction from compressed, especially welded, metal sheets.

Sheet-metal control arms have a base body and at their ends eyelets in which chassis bearings are pressed in. Chassis bearings may either be directly pressed into the eyelets of the sheet-metal control arms or pressed into welded-in sleeves in the eyelets. A conventional sheet-metal control arm of this type for a wheel suspension of a motor vehicle is illustrated in FIG. 1 and generally designated by reference numeral 1. The sheet-metal control arm 1 has a base body 2 and two eyelets 4, 14 arranged in spaced-apart relationship at one end of the base body 2. The eyelets 4, 14 have openings 7, 17 for receiving a chassis bearing, in particular a rubber-metal bearing or elastomer-metal bearing. Each eyelet 4, 14 has a wall 5, 15, with the walls 5, 15 of the eyelets 4, 14 confronting one another. A gap 8 is formed between the walls 5, 15 of the eyelets 4, 14, especially the end faces of the walls 5, 15, as a result of restrictions during the deep-drawing process for making the walls 5, 15.

A sheet-metal control arm 1 of this type has shortcomings because the neighboring eyelets 4, 14 have no connection with one another at the one end of the sheet-metal control arm 1. As a result, the interference fit of a chassis bearing is difficult to adjust and the eyelets 4, 14 may slip in the event of overload. The eyelets 4, 14 which are arranged at a distance to one another may not be configured wider because this would require excessive degree of shaping during production of the sheet-metal control arm 1.

It would therefore be desirable and advantageous to provide an improved sheet-metal control arm to obviate prior art shortcomings and to ensure a lasting shape stability while yet being producible with eyelets in a simple manner and preventing slippage of the eyelets.

SUMMARY OF THE INVENTION

According to one aspect of the present invention, a sheet-metal control arm for a wheel suspension of a motor vehicle includes a base body, and two eyelets arranged in spaced-apart relationship at least at one end of the base body and having openings for receiving a chassis bearing, at least one of the eyelets having a wall provided with a projection which is configured to at least partly bridge a gap to a wall of the other one of the eyelets.

A sheet-metal control arm according to the present invention is very stable in shape. The projection on a wall of at least one of the two eyelets effectively prevents a deformation of the eyelets because in the event of an impending deformation the projection of the one eyelet bears upon the wall of the other eyelet. In other words, as the projection of one eyelet bears upon the wall of the other eyelet, the eyelets are prevented from moving towards one another.

The projection forms a contact surface between the two eyelets without adversely affecting the degree of shaping of the sheet-metal control arm because the projection, unlike the wall, does not extend all-around but rather is sized to extend only about a part of the wall. Of course, the presence of several individual projections on a wall of one or both eyelets is conceivable as well, with the projections being arranged about a wall in spaced-apart relationship. Although the projection is not intended to absorb tensile forces in view of the absence of a fixed connection between the projection of the wall of one eyelet with the wall of the other eyelet, the projection is still able to absorb pressure forces when bearing upon the wall of the confronting eyelet so that the respective eyelet is prevented from slipping or deforming.

According to another advantageous feature of the present invention, the projection on the wall of the at least one of the eyelets may be formed in one piece, especially monolithic, with the wall. For example, a sheet-metal control arm may be manufactured by a stamping process and subsequent deep-drawing process from a single metal sheet. The projection is punched out during the stamping process so that the subsequent shaping during the deep-drawing process to form the eyelets and walls of the eyelets automatically produces also the projection or projections.

According to another advantageous feature of the present invention, the openings of the two eyelets may extend in coaxial relationship.

According to another advantageous feature of the present invention, the wall of one of the eyelets and the wall of the other one of the eyelets may confront one another, with a gap being formed between the confronting end faces of the wall and bridged or substantially bridged by the projection. Thus, the projection is advantageously sized to correspond to the distance between the end faces of the walls of the eyelets. As a result, the eyelets are prevented from moving towards one another when exposed to stress so that deformation of the eyelets is avoided.

According to another advantageous feature of the present invention, the wall of each of the eyelets may be formed as a circumferential collar. In other words, the wall of each eyelet has a hollow-cylindrical profile. The gap between the end faces of the walls is provided because the extension of the walls is limited as a result of the degree of shaping of the metal sheet. Thus, the smaller the gap between the end faces of the walls, the greater the degree of shaping for producing the walls. To keep this at a minimum and thus to simplify the production of the sheet-metal control arm and render it more cost-efficient, the projection is provided on a wall of at least one of the eyelets. As the projection is only locally present, the degree of shaping is not increased during production of the eyelets of the sheet-metal control arm. Advantageously, as described above, the wall of each eyelet is realized as a circumferential collar.

According to another advantageous feature of the present invention, the wall of the at least one of the eyelets can have plural projections in spaced-apart relationship about the wall. Advantageously, adjacent ones of the projections can be spaced from one another at a same distance. This ensures that an eyelet will bear upon the other eyelet when various areas are exposed to stress so that slippage of the eyelets or deformation of the eyelets is prevented. For example, three or more, advantageously four or five, projections may be arranged on a wall or end face of a wall of an eyelet. The presence of the projections ensures an even distribution of encountered pressure forces upon the respectively other eyelet so that the respective eyelet cannot deform.

According to another advantageous feature of the present invention, the wall of each of the eyelets can have plural projections, with the projections of the wall of one of the eyelets arranged in offset relationship to the projections of the wall of the other one of the eyelets. In this way, a deformation of both eyelets is reliably prevented. Spreading the projections to both eyelets ensures a slight degree of shaping of the sheet-metal control arm. For example, three projections may be arranged on the wall of the one eyelet, and three projections may be arranged on the wall of the opposing eyelet. In total, there are thus six projections which resist a deformation of the eyelets as soon as the eyelets are exposed to stress.

According to another advantageous feature of the present invention, the projection may have a curved configuration in correspondence with a curvature of the wall, with the projection extending flush to the wall. This configuration of the projection is automatically realized when the walls of the eyelets are produced in a deep-drawing process.

According to another advantageous feature of the present invention, the projection can be sized to bear upon the wall of the other one of the eyelets. In this way, the projection is able to directly absorb pressure forces in the event the eyelet in opposition to the projection is exposed to stress and may start to deform. By resisting the pressure forces, any further deformation is prevented.

According to another aspect of the present invention, a wheel suspension of a motor vehicle includes a sheet-metal control arm which includes a base body, and two eyelets arranged in spaced-apart relationship at least at one end of the base body and having openings for receiving a chassis bearing, at least one of the eyelets having a wall provided with a projection which is configured to at least partly bridge a gap to a wall of the other one of the eyelets. Advantageously, the wheel suspension includes two or more sheet-metal control arms.

According to yet another aspect of the present invention, a motor vehicle includes a wheel suspension having a sheet-metal control arm which includes a base body, and two eyelets arranged in spaced-apart relationship at least at one end of the base body and having openings for receiving a chassis bearing, at least one of the eyelets having a wall provided with a projection which is configured to at least partly bridge a gap to a wall of the other one of the eyelets.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
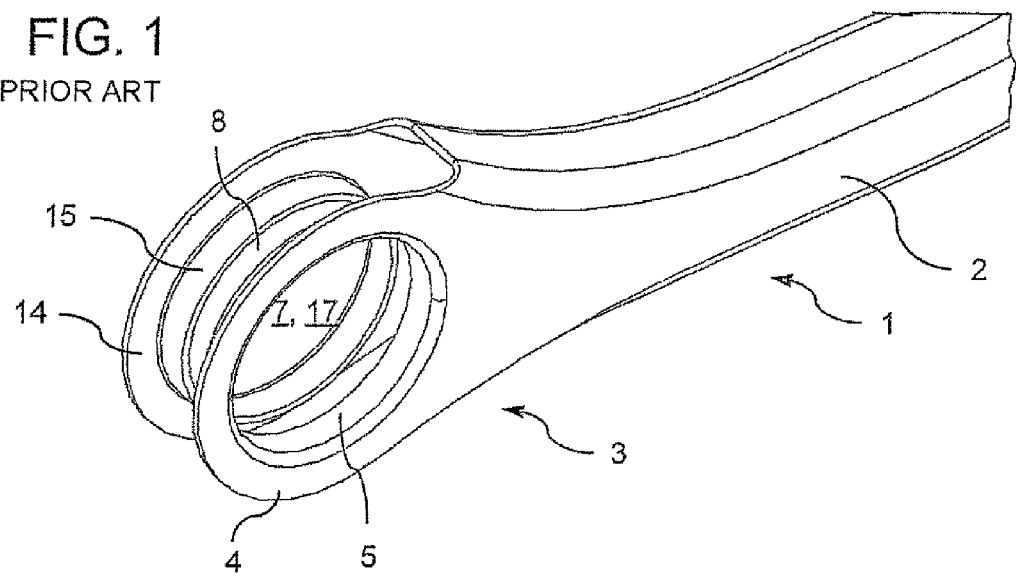
FIG. 1 is a side perspective view of a conventional sheet-metal control arm with two eyelets on one end.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
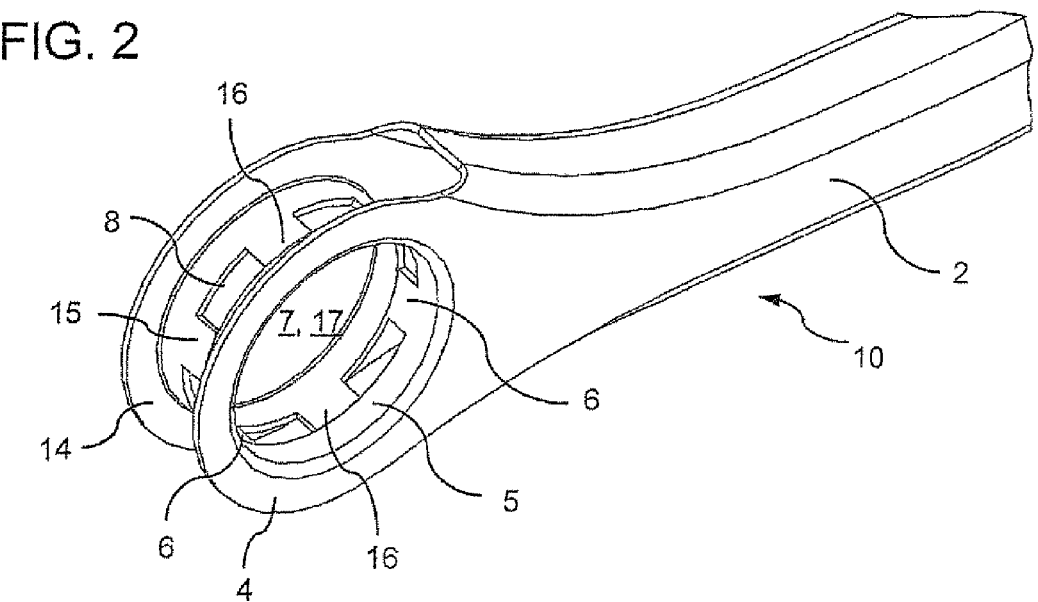
FIG. 2 is a side perspective view of a sheet-metal control arm according to the present invention.

Turning now to the drawing, and in particular to FIG. 2, there is shown a side perspective view of a sheet-metal control arm according to the present invention, generally designated by reference numeral 10. Parts corresponding with those in FIG. 1 are denoted by identical reference numerals and not explained again. The description below will center on the differences between the embodiments. In this embodiment, provision is made for a projection or projections 6, 16 on the walls 5, 15 to bridge the gap 8 to the respectively opposite wall 5, 15. The projections 6, 16 are able to provide a connection or a contact surface between the confronting walls 5, 15 or between the two end faces of the walls 5, 15, without increasing the degree of shaping. The degree of shaping is not increased because, unlike the walls 5, 15, the projections 6, 16 do not extend all-around but rather are provided individually at certain locations. As the projections 6, 16 are sized to bear or almost bear upon the wall of the opposite eyelet 4, 14, they are able to absorb pressure forces so that the eyelets 4, 14 are prevented from deforming when the sheet-metal control arm 10 is exposed to stress.

The projections 6, 16 may be provided on the wall 5, 15 of only one eyelet 4, 14. Advantageously, projections 6, 16 are provided on the walls 5, 15 of both eyelets 4, 14, as this is shown by way of example in FIG. 2. Advantageously, the projections 6, 16 are arranged on the eyelets 4, 14 in such a way that a projection 16 of one of the eyelets, here eyelet 14, is arranged between two projections 6 of the other one of the eyelets, here eyelet 4. In other words, projections 6, 16 are alternatively arranged on the eyelets 4, 14 about the circumference of the openings 7, 17 which form the eyelets 4, 14 to receive a chassis bearing. The projections 6, 16 resist a deformation of the eyelets 4, 14, when the sheet-metal control arm 10 and the chassis bearing received in the openings 7, 17 are exposed to stress.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A sheet-metal control arm for a wheel suspension of a motor vehicle, said control arm comprising:
    a base body; and
    two eyelets arranged in spaced-apart relationship at least at one end of the base body and having openings for receiving a chassis bearing, at least one of the eyelets having a wall extending from the base body in a direction of the other one of the eyelets, and projection extending from the wall and configured to at least partly bridge a gap to a wall of the other one of the eyelets.

2. The control arm of claim 1, wherein the projection is formed in one piece with the wall.

3. The control arm of claim 1, wherein the openings of the two eyelets extend in coaxial relationship.

4. The control arm of claim 1, wherein the wall of each of the eyelets is formed as a circumferential collar.

5. The control arm of claim 1, wherein the wall of the at least one of the eyelets has plural projections in spaced-apart relationship about the wall.

6. The control arm of claim 1, wherein the wall of one of the eyelets and the wall of the other one of the eyelets confront one another.

7. The control arm of claim 5, wherein adjacent ones of the projections are spaced from one another at a same distance.

8. The control arm of claim 1, wherein the wall of each of the eyelets has plural projections, with the projections of the wall of one of the eyelets arranged in offset relationship to the projections of the wall of the other one of the eyelets.

9. The control arm of claim 1, wherein the projection has a curved configuration in correspondence with a curvature of the wall, with the projection extending flush to the wall.

10. The control arm of claim 1, wherein the projection is sized to bear upon the wall of the other one of the eyelets.

11. A wheel suspension of a motor vehicle, said wheel suspension comprising a sheet-metal control arm which includes a base body, and two eyelets arranged in spaced-apart relationship at least at one end of the base body and having openings for receiving a chassis bearing, at least one of the eyelets having a wall extending from the base body in a direction of the other one of the eyelets, and a projection extending from the wall and configured to at least partly bridge a gap to a wall of the other one of the eyelets.

12. The wheel suspension of claim 11, wherein the openings of the two eyelets extend in coaxial relationship.

13. The wheel suspension of claim 11, wherein the wall of each of the eyelets is formed as a circumferential collar.

14. The wheel suspension of claim 11, wherein the wall of the at least one of the eyelets has plural projections in spaced-apart relationship about the wall.

15. The wheel suspension of claim 11, wherein the wall of one of the eyelets and the wall of the other one of the eyelets confront one another.

16. The wheel suspension of claim 14, wherein adjacent ones of the projections are spaced from one another at a same distance.

17. The wheel suspension of claim 11, wherein the wall of each of the eyelets has plural projections, with the projections of the wall of one of the eyelets arranged in offset relationship to the projections of the wall of the other one of the eyelets.

18. The wheel suspension of claim 11, wherein the projection has a curved configuration in correspondence with a curvature of the wall, with the projection extending flush to the wall.

19. The wheel suspension of claim 11, wherein the projection is sized to bear upon the wall of the other one of the eyelets.

20. A motor vehicle, comprising a wheel suspension having a sheet-metal control arm which includes a base body, and two eyelets arranged in spaced-apart relationship at least at one end of the base body and having openings for receiving a chassis bearing, at least one of the eyelets having a wall extending from the base body in a direction of the other one of the eyelets, and a projection extending from the wall and configured to at least partly bridge a gap to a wall of the other one of the eyelets.

* * * * *